United States Patent [19]

Treat et al.

[11] Patent Number: 5,354,805

[45] Date of Patent: * Oct. 11, 1994

[54] ADHESIVE COMPOSITION FOR BONDING NITRILE RUBBER TO METAL

[75] Inventors: Carol J. Treat, Erie; Douglas H. Mowrey, Pleasantville, both of Pa.

[73] Assignee: Lord Corporation, Erie, Pa.

[*] Notice: The portion of the term of this patent subsequent to Nov. 10, 2009 has been disclaimed.

[21] Appl. No.: 67,266

[22] Filed: May 25, 1993

Related U.S. Application Data

[63] Continuation of Ser. No. 877,555, May 1, 1992, abandoned.

[51] Int. Cl.$^5$ ............................................. C08L 61/10
[52] U.S. Cl. .................................. 524/510; 524/432; 524/501
[58] Field of Search .......................................... 524/510

[56] References Cited

U.S. PATENT DOCUMENTS

| 3,258,388 | 6/1966 | Coleman et al. | 161/218 |
|---|---|---|---|
| 3,258,389 | 6/1966 | Coleman et al. | 161/218 |
| 3,282,883 | 11/1966 | DeCrease et al. | 260/41 |
| 3,884,859 | 5/1975 | Honda et al. | 524/510 |
| 4,119,587 | 10/1978 | Jazenski et al. | 260/3.5 |
| 4,167,500 | 9/1979 | Jazenski et al. | 260/29.3 |
| 4,988,753 | 1/1991 | Rullmann et al. | 524/260 |
| 5,162,156 | 11/1992 | Troughton, Jr. et al. | 428/460 |

*Primary Examiner*—Romulo H. Delmendo
*Attorney, Agent, or Firm*—W. Graham Buie

[57] ABSTRACT

An aqueous adhesive composition for bonding nitrile rubber. The adhesive composition contains a chlorosulfonated polyethylene latex, a polyhydroxy phenolic resin copolymer, and a high molecular weight aidehyde polymer. The adhesive composition exhibits an unusual affinity for nitrile rubber and exhibits excellent adhesive performance as a single-coat formulation. The adhesive composition withstands high temperature bonding conditions and minimizes the utilization of volatile organic solvents.

17 Claims, No Drawings

ADHESIVE COMPOSITION FOR BONDING NITRILE RUBBER TO METAL

This is a continuation of copending application Ser. No. 07/877,555 filed May 1, 1992, now abandoned.

FIELD OF THE INVENTION

The present invention relates to the bonding of rubber of elastomeric materials to substrates such as metal. More specifically, the present invention relates to a one-coat, aqueous adhesive composition which is particularly useful for bonding acrylonitrile-butadiene copolymer rubber to a metal substrate.

BACKGROUND OF THE INVENTION

Acrylonitrile-butadiene copolymer rubber, commonly referred to as nitrile or NBR rubber, is well recognized for its outstanding oil resistance and hence its excellent performance in seal applications where it is necessary to prevent the passage of oil or other fluid from one compartment to another in a given device. For example, ball bearings or other components surrounding a shaft or axle are typically enclosed within a housing that contains oil, grease, or other lubricant fluid. The lubricant fluid is typically sealed within the housing with a metal ring or cylinder which is lined with an elastomeric material such as nitrile rubber. The seal prevents leakage of the lubricant fluid and prevents contaminants from entering the housing.

In order for nitrile rubber to be utilized in seal applications, the nitrile rubber is typically adhesively bonded to a metal ting, cylinder, or the like. The nitrile rubber is typically bonded to the metal ting or cylinder by applying an adhesive to the ring or cylinder and compression molding, transfer molding, injection molding, or autoclave molding the nitrile rubber to the ring or cylinder at temperatures ranging from 175° C. to 200° C. The resulting rubber-lined ting or cylinder is then used in combination with a shaft or axle to form the fluid-tight seal.

Previous adhesive compositions utilized for bonding nitrile rubber are based on organic solvents and hence are becoming more and more undesirable in light of the increasingly circumscribing environmental regulations relating to volatile organic solvents. Many of the previous adhesive compositions have also been found to be adversely affected by the high-bonding temperature (175° C. to 200° C.) which can cause premature degradation of the adhesive, resulting in susceptibility to corrosion at the adhesive-metal interface.

A need therefore exists for an environmentally acceptable aqueous adhesive composition for bonding nitfile rubber that can withstand high temperature bonding conditions. Such an adhesive composition should be capable of being applied as a one-coat formulation and should also be capable of forming an adhesive bond that can withstand adverse environments such as corrosive materials and high temperature fluids.

SUMMARY OF THE INVENTION

The present invention is an aqueous adhesive composition for bonding nitrile rubber which is capable of withstanding high temperature bonding conditions. The present adhesive composition minimizes the utilization of volatile organic solvents and exhibits excellent adhesive properties as a single-coat adhesive. The present invention comprises a chlorosulfonated polyethylene latex, a polyhydroxy phenolic resin copolymer, and a high molecular weight aidehyde polymer. It has been presently discovered that this particular combination of ingredients has an exceptional bonding affinity for nitrile rubber. This strong affinity for nitrile rubber is evidenced by the fact that the present adhesive composition provides for excellent adhesive performance after high temperature bonding to a variety of nitfile rubber substrates.

DETAILED DESCRIPTION OF THE INVENTION

The present adhesive composition comprises a chlorosulfonated polyethylene latex, a polyhydroxy phenolic resin copolymer, and a high molecular weight aidehyde polymer.

The chlorosulfonated polyethylene of the latex of the present invention is commercially available and can be prepared according to methods well known in the art, such as by dissolving polyethylene in carbon tetrachloride and subjecting the resulting solution to a mixture of chlorine gas and sulfur dioxide gas under high temperature and high pressure. The carbon tetrachloride is then removed to produce a powder of chlorosulfonated polyethylene. The latex of chlorosulfonated polyethylene of the present invention is also commercially available and can be prepared according to methods known in the art such as by dissolving the chlorosulfonated polyethylene in a solvent and adding a surfactant to the resulting solution. Water is then added to the solution under high shear to emulsify the polymer. The solvent is then stripped to obtain a latex having a total solids content of from about 10 to 60, preferably 25 to 50, percent by weight.

The chlorosulfonated polyethylene of the latex of the present invention typically has a number average molecular weight in the range of about 50,000 to 150,000, preferably about 60,000 to 120,000. The chlorine content of the chlorosulfonated polyethylene is typically in the range of about 20 to 50, preferably about 25 to 45, percent while the sulfur content is typically in the range of about 0.5 to 2, preferably about 1.0 to 1.5 percent.

The chlorosulfonated polyethylene latex is typically utilized in an amount ranging from about 10 to 60, preferably about 30 to 40, percent by weight of the essential components of the present invention. "Essential components" herein refers to the chlorosulfonated polyethylene latex, the phenolic resin copolymer, and the high molecular weight aidehyde polymer.

The polyhydroxy phenolic resin copolymer of the present invention comprises a phenolic resin prepared from certain multihydroxy aromatic compounds and a formaldehyde source. Specifically, the phenolic resin copolymer of the present invention is prepared by combining a monohydroxy and/or a dihydroxy aromatic compound, as a first phenolic component, with a trihydroxy aromatic compound, as a second phenolic component, and a formaldehyde source under reaction conditions sufficient to create a phenolic resin copolymer.

The monohydroxy, dihydroxy and trihydroxy aromatic compounds of the present invention can be essentially any aromatic compound having one, two and three hydroxy substituents, respectively. The aromatic compound is preferably benzene, and the other non-hydroxy substituents on the benzene ting or other aromatic compound may be hydrogen, alkyl, aryl, alkylaryl, arylalkyl carboxy, alkoxy, amide, imide, halogen or the like. The non-hydroxy substituents are most preferably hydrogen and, if alkyl, are preferably lower alkyls having from 1 to 10 carbon atoms including methyl, ethyl, propyl, amyl, and nonyl. Representative monohydroxy compounds include phenol, p-t-butyl phenol, p-phenylphenol, p-chloro-phenol, p-alkoxyphenol, o-cresol, m-cresol, o-chlorophenol, m-bromophenol, 2-ethylphenol, amyl phenol, and nonyl phenol, with phenol, p-t-butyl phenol and nonyl phenol being preferred. Representative dihydroxy compounds include resorcinol, hydroquinone and catechol with resorcinol being the preferred dihydroxy aromatic compound. The monohydroxy aromatic compound, dihydroxy aromatic compound or combination thereof comprises the first phenolic component and is utilized in the invention in an amount from about 1 to 97, preferably from about 75 to 95 percent by weight of the ingredients (excluding solvent) utilized to prepare the phenolic resin copolymer.

Representative trihydroxy compounds include pyrogallol, gallates such as propyl gallate, robinerin, baptigenin and anthragallol, with pyrogallol being the preferred trihydroxy aromatic compound. The trihydroxy aromatic compound comprises the second phenolic component and is utilized in the invention in an amount from about 1 to 97, preferably from about 5 to 25 percent by weight of the ingredients (excluding solvent) utilized to prepare the phenolic resin copolymer.

It should be noted that it is believed that the effectiveness of the present phenolic resin copolymer is based on the presence of the trihydroxy aromatic compound (the second phenolic component) in the copolymer, and therefore, the trihydroxy aromatic compound is an essential component of the copolymer. The first phenolic component of the copolymer may be a monohydroxy aromatic compound, a dihydroxy aromatic compound, or a combination thereof. However, the use of at least one dihydroxy aromatic compound in the first phenolic component of the invention has been shown to exhibit exceptional bonding ability (possibly due to the numerous hydroxy groups present in the resulting copolymer), and a dihydroxy aromatic compound is therefore particularly preferred for use in the first phenolic component of the invention.

The present phenolic resin copolymer requires a formaldehyde source in order to react with the multihydroxy aromatic compounds to form a novolak phenolic resin copolymer. The formaldehyde source can essentially be any type of formaldehyde known to react with hydroxy aromatic compounds to form novolak phenolic resins. Typical compounds useful as a formaldehyde source in the present invention include formaldehyde and aqueous solutions of formaldehyde, such as formalin; acetaldehyde; propionaldehyde; isobutyraldehyde; 2-ethylbutyraldehyde; 2-methylpentaldehyde; 2-ethylhexaldehyde; benzaldehyde; as well as compounds which decompose to formaldehyde, such as paraformaldehyde, trioxane, furfural, hexamethylenetetramine; acetals which liberate formaldehyde on heating; and the like. The formaldehyde source is utilized in an amount ranging from about 1 to 25, preferably from about 5 to 15 percent by weight of the ingredients utilized to prepare the phenolic resin copolymer. When utilizing an aqueous solution of formaldehyde such as formalin, the percent by weight of formaldehyde source is based on actual formaldehyde content.

The phenolic resin copolymer is typically prepared by first dissolving the first phenolic component and the second phenolic component in a suitable solvent. Solvents useful for this purpose include water; ether alcohols, such as the commercially available propylene glycol monoethyl ether sold as DOWANOL PM by the Dow Chemical Company; methylisobutyl ketone; toluene; xylene; perchloroethylene; and mixtures thereof; with DOWANOL PM or an approximately 1:2 DOWANOL PM/water mixture being the preferred solvents. A catalytic amount of an acid such as concentrated phosphoric acid, oxalic acid, sulfuric acid, hydrochloric acid or nitric acid, preferably phosphoric acid, is then added to the dissolved hydroxy compound mixture and the temperature of the mixture is raised to between about 80° C. and 110° C. The formaldehyde source is then added to the mixture at a constant rate over a period of about 30 minutes to 1 hour. After the resulting exothermic reaction is complete and the corresponding heat evolution is complete, the mixture is then held at a temperature between about 80° C. and 120° C. for a period of time ranging from about 30 minutes to 2 hours in order to insure completion of the polymerization reaction. The mixture is allowed to cool to room temperature. The final resin copolymer has a solids content of between about 30 and 70, preferably between about 40 and 60 weight percent, and contains about 15 percent organic solvent, accounting for all of the organic solvent contained in the final adhesive. The phenolic resin copolymer typically has a number average molecular weight of between about 500 and 1500, preferably between about 750 and 1000.

The phenolic resin copolymer is typically utilized in an amount ranging from about 10 to 80, preferably from about 30 to 60 percent by weight of the essential components of the present invention.

The high molecular weight aldehyde polymer of the present invention can be an aldehyde homopolymer or copolymer. Typical high molecular weight aldehyde homopolymers and copolymers include acetal homopolymers, acetal copolymers, gamma-polyoxymethylene ethers having the characteristic structure:

$$R_{10}O-(CH_2O)_n-R_{11};$$

and polyoxymethylene glycols having the characteristic structure:

$$HO-(R_{12}O)_x-(CH_2O)_n-(R_{13}O)_x-H;$$

wherein $R_{10}$ and $R_{11}$ can be the same or different and each is an alkyl group having from 1 to 8, preferably 1 to 4, carbon atoms; $R_{12}$ and $R_{13}$ can be the same or different and each is an alkylene group having from 2 to 12, preferably 2 to 8, carbon atoms; n is greater than 100, and is preferably in the range from about 200 to about 2000; and x is in the range from 0 to 8, preferably 1 to 4, with at least one x being equal to at least 1. The high molecular weight aldehyde homopolymers and copolymers are further characterized by a melting point of at least 75° C., i.e., they are substantially inert with respect to the phenolic system until heat activated; and by being substantially completely insoluble in water at a temperature below the melting point. The acetal homopolymers and acetal copolymers are well-known articles of commerce. The polyoxymethylene materials are also well known and can be readily synthesized by the reaction of monoalcohols having from 1 to 8 carbon atoms or dihydroxy glycols and ether glycols with polyoxymethylene glycols in the presence of an acidic catalyst. A representative method of preparing polyoxymethylene materials is described in U.S. Pat. No. 2,512,950, which is incorporated herein by reference.

Gamma-polyoxymethylene ethers are generally preferred and a particularly preferred aidehyde polymer for use in the practice of the invention is 2-polyoxymethylene dimethyl ether. The high molecular weight aidehyde polymer is typically employed in an amount ranging from about 1 to 30, preferably from about 5 to 15 percent by weight of the essential components of the present invention.

The adhesive compositions of the present invention can optionally contain other well-known additives including plasticizers, fillers, pigments, dispersing and wetting agents, surfactants, reinforcing agents and the like, in amounts employed by those skilled in the adhesive arts to obtain the desired color, application properties, and consistency. Examples of optional ingredients of particular use in the present invention include zinc oxide, carbon black, silica, and titanium dioxide.

Water, preferably deionized water, is utilized in combination with the essential components and any optional components of the present invention in order to provide an adhesive composition having a final solids content of between about 10 and 70 weight percent, preferably between about 15 and 40 weight percent.

The adhesive compositions of the present invention may be prepared by any method known in the art, but are preferably prepared by combining and milling or shaking the ingredients and water in a ball-mill, sand-mill, pebble-mill, ceramic bead-mill, steel bead-mill, high speed media-mill, or the like.

The adhesive compositions of the invention are preferably utilized to bond nitrile rubber to a metal surface. The composition may be applied to the metal surface by spraying, dipping, brushing, wiping or the like, after which the adhesive is permitted to dry. The coated metal surface and nitrile rubber are then brought together under heat and pressure to complete the bonding procedure. The surface of the metal and the nitrile rubber are typically brought together under a presstire of from about 20.7 to 172.4 Mega Pascals (MPa), preferably from about 20 MPa to 50 MPa. The resulting rubber-metal assembly is simultaneously heated to a temperature of from about 140° C. to about 210° C., preferably from about 175° C. to 200° C. The assembly should remain under the applied pressure and temperature for a period of from about 1 minute to 60 minutes, depending on the cure rate and thickness of the rubber substrate. This process may be carded out by applying the rubber substrate as a semi-molten material to the metal surface as in, for example, an injection-molding process. The process may also be carded out by utilizing compression molding, transfer molding or autodave curing techniques. After the process is complete, the bond is fully vulcanized and ready for use in a final application.

The nitrile rubber which can be bonded with the present adhesive compositions can be any type of acrylonitrile-butadiene copolymer rubber including sulfur-cured or peroxide-cured nitrile rubber. The nitrile rubber may contain varying amounts of acrylonitrile and/or filler compounds and may have a high or low modulus. The nitrile rubber may also be hydrogenated or carboxylated. One of the attributes of the adhesive compositions of the present invention is their ability to effectively bond a wide variety of nitrile rubbers.

Although preferred for use in bonding nitrile rubber to a metal surface, the present adhesive compositions may be applied as an adhesive to any surface or substrate capable of receiving the adhesive. The surface to which the preferred nitrile rubber may be bonded can be any surface capable of receiving the adhesive such as a glass, plastic, nylon or fabric surface, and is preferably a metal surface selected from any of the common structural metals such as iron, steel (including stainless steel, clean cold-rolled steel, grit-blasted steel, and phosphatized steel), lead, aluminum, copper, brass, bronze, Monel metal, nickel, zinc, and the like. To bond the various substrates described above, the present adhesive may be applied to one or both of the surfaces or substrates to be bonded, after which the substrates are contacted under conditions sufficient to create an adhesive bond.

The following examples are provided for the purpose of illustration only and are not intended to limit the scope of the present invention which is defined by the claims.

PREPARATION OF PHENOLIC RESIN COPOLYMER

To a 200-gallon reactor equipped with a stirring blade and a jacket for controlling temperature are added 100 lbs. of deionized water, 139 lbs. of DOWANOL PM and 0.1 lb. of phosphoric acid. While stirring and heating the reactor, 371 lbs. of resorcinol and 22 lbs. of pyrogallol are added. The mixture is heated and stirred until the temperature reaches 90° C. and the pyrogallol and resorcinol are dissolved. Through a port in the reactor, 190 lbs. of formalin solution (aqueous solution of 37 percent formaldehyde) are added at a constant rate over a period of 30 minutes to one hour. After the addition of the formalin is complete, the resin is maintained for one hour at 95° C. to ensure completion of the reaction. To the resulting resin is then added 105 lbs. of aleionized water to bring the final solids content to 45 weight percent.

EXAMPLE 1

To 194 g of the phenolic resin copolymer as prepared above is added 37 g of 2-polyoxymethylene dimethylether. This mixture is then pebble-milled for four hours. To the resulting mixture is added 250 g of aleionized water and 140 g of a chlorosulfonated polyethylene latex (HYPALON HYP-605- Burke-Palmason Chemical Company). To this mixture is then added ammonium hydroxide, adjusting the pH to 8. Finally, 250 g of deionized water is added to create a final total solids content of 20 weight percent, with a maximum particle size of one rail.

The adhesive composition prepared above in Example 1 is diluted to five percent solids, coated onto phosphatized steel at a film thickness less than 0.1 rail, and then bonded to three different stocks of nitrile rubber (Stocks 1 and 3 are peroxide-cured, Stock 2 is sulfur-cured) by compression molding at 205° C. for five minutes. The resulting bonded parts are pulled to destruction according to ASTM test D429 - Method B. The results are shown below in Table 1.

In the data from the bonding tests given below in Table 1, reference is made to failure in the rubber body (R). Failure is expressed in terms of percent, and a high percent of failure in the rubber is desirable since this indicates that the adhesive bond is stronger than the rubber itself. The pounds of pull indicate the pounds of force per lineal inch needed to pull the rubber body from the metal.

TABLE 1

|  | STOCK 1 | | STOCK 2* | | STOCK 3 | |
| --- | --- | --- | --- | --- | --- | --- |
|  | Pull Value | Failure | Pull Value | Failure | Pull Value | Failure |
|  | 53 | 100R | 60 | 96R | 82 | 50R |
|  | 53 | 95R | 69 | 97R | 85 | 40R |
|  | 51 | 100R | 64 | 99R | 74 | 37R |
|  | 61 | 97R | 50 | 70R | 68 | 48R |
|  | 62 | 99R | 51 | 98R | 72 | 25R |
|  | 51 | 86R | — | — | 76 | 40R |
| Average | 55 | 96R | 59 | 92R | 76 | 40R |

*Only five parts were tested.

120-HOUR 250° F. EXPOSURE TO HOT OIL

Bonded parts are prepared the same way as they are for the salt spray test. In this test, the parts are placed in a can filled with ASTM Oil #3. The can containing the parts is then heated to 250° F. for 120 hours. Upon removal, the rubber is peeled from the metal with pliers. The percent rubber retention on the part is then measured.

The results of the above tests are shown below in Table 2.

TABLE 2

| Test | Stock 1 | | Stock 2 | | Stock 3 | | Stock 4 | |
| --- | --- | --- | --- | --- | --- | --- | --- | --- |
|  | Failure | Pull Value | Failure | Pull Value | Failure | Pull Value | Failure | Pull Value |
| Primary adhesion | 100R | 102 | 100R | 99 | 98R | 72 | 100R | 55 |
| 2-hr. boiling water | 100R | — | 100R | — | 100R | — | 100R | — |
| 144 hr. salt spray | 100R | — | 100R | — | 100R | — | 100R | — |
| 120 hrs. hot oil (250° F.) | 100R | — | 100R | — | 100R | — | 100R | — |

EXAMPLE 2

To 238 g of the phenolic resin copolymer as prepared above is added 50 g of 2-polyoxymethylene dimethylether, 59 g of zinc oxide, 6 g of titanium dioxide, 6 g of fumed silica, 40 g of carbon black, and 242 g of deionized water. This mixture is pebble-milled for four hours. The resulting dispersion is blended with 228 g of a chlorosulfonated polyethylene latex (HYPALON HYP-605 - Burke-Palmason Chemical Company) and 160 g of deionized water. The adhesive has a final solids content of 35 weight percent and a maximum particle size of one mil.

The adhesive composition prepared above in Example 2 is coated onto phosphatized steel at a film thickness of 0.1 rail and then bonded to four different stocks of nitfile rubber (Stocks 1 and 2 are sulfur-cured, Stock 3 is carboxylated and peroxide-cured, Stock 4 is peroxide-cured) by compression molding at 190° C. for five minutes. The resulting bonded parts are then subjected to various tests described below.

PRIMARY ADHESION

Bonded parts are pulled to destruction according to ASTM test D429- Method B.

144-Hour Salt Spray

Bonded parts are buffed on the edges with a grinding wheel. The rubber is then tied back over the metal with stainless steel wire. This exposes the bondline to the environment. Failure is initiated by scoring the bondline with a razor blade. The parts are then strung on stainless steel wire and placed in a salt spray chamber. The environment inside the chamber is 100° F., 100 percent relative humidity, and 5 percent dissolved salt in the spray, which is dispersed throughout the chamber. The parts remain in this environment for 144 hours. Upon removal, the rubber is peeled from the metal with pliers. The percent rubber retention on the part is then measured.

TWO-HOUR BOILING WATER

Bonded parts are prepared the same way as they are for the salt spray test; however, in this test, the parts are placed in a beaker filled with boiling tap water. The parts remain in this environment for 2 hours. Upon removal, the rubber is peeled from the metal with pliers.

As can be seen from the above data, the adhesive compositions of the present invention can be applied as a one-coat formulation to a variety of nitrile rubber substrates so as to form a robust adhesive bond which is capable of withstanding high temperature bonding conditions and adverse environments.

What is claimed is:

1. A single-coat adhesive composition for bonding nitrile rubber to a metal surface comprising a chlorosulfonated polyethylene latex, a polyhydroxy phenolic resin copolymer, and a high molecular weight aldehyde polymer wherein the phenolic resin copolymer is prepared by combining a monohydroxy and/or a dihydroxy aromatic compound, as a first phenolic component, with a trihydroxy aromatic compound, as a second phenolic component, and a formaldehyde source under reaction conditions sufficient to create the phenolic resin copolymer and wherein the high molecular weight aldehyde polymer is selected from the group consisting of acetal homopolymers, acetal copolymers, gamma-poloxymethylene ethers having the characteristic structure:

$$R_{10}O-(CH_2O)_n-R_{11};$$

and
polyoxymethylene glycols having the characteristic structure:

$$HO-(R_{12}O)_x-(CH_2O)_n-(R_{13}O)_x-H$$

wherein $R_{10}$ and $R_{11}$ can be the same or different and each is an alkyl group having from 1 to 8 carbon atoms; $R_{12}$ and $R_{13}$ can be the same or different and each is an alkylene group having from 2 to 12 carbon atoms; n is greater than 100; and x is in the range from 0 to 8 with at least one x being equal to at least 1.

2. An adhesive composition according to claim 1 wherein the latex has a number average molecular weight in the range of about 50,000 to 150,000, a chlorine content in the range of about 20 to 50 percent, and a sulfur content in the range of about 0.5 to 2.0 percent.

3. An adhesive composition according to claim 2 wherein the latex has a number average molecular weight in the range of about 60,000 to 120,000 a chlorine content in the range of about 25 to 45 percent, and a sulfur content in the range of about 1.0 to 1.5 percent.

4. An adhesive composition according to claim 1 wherein the first phenolic component is a monohydroxy aromatic compound selected from the group consisting of phenol, p-t-butyl phenol, p-phenylphenol, p-chlorophenol, p-alkoxyphenol, o-cresol, m-cresol, o-chlorophenol, m-bromophenol, 2-ethylphenol, amyl phenol, and nonyl phenol.

5. An adhesive composition according to claim 1 wherein the first phenolic component is a dihydroxy aromatic compound selected from the group consisting of resorcinol, hydroquinone, and catechol.

6. An adhesive composition according to claim 1 wherein the trihydroxy aromatic compound is selected from the group consisting of pyrogallol, gallates, robinetin, baptigenin and anthragallol.

7. An adhesive composition according to claim 1 wherein the formaldehyde source is selected from the group consisting of formaldehyde, formalin, acetaldehyde, propionaldehyde, isobutyraldehyde, and paraformaldehyde.

8. An adhesive composition according to claim 4 wherein the monohydroxy aromatic compound is phenol.

9. An adhesive composition according to claim 5 wherein the dihydroxy aromatic compound is resorcinol.

10. An adhesive composition according to claim 6 wherein the trihydroxy aromatic compound is pyrogallol.

11. An adhesive composition according to claim 7 wherein the formaldehyde source is formalin.

12. An adhesive composition according to claim 1 wherein $R_{10}$ and $R_{11}$ can be the same or different and each is an alkyl group having from 1 to 4 carbon atoms; $R_{12}$ and $R_{13}$ can be the same or different and each is an alkylene group having from 2 to 8 carbon atoms; n is in the range from about 200 to about 2,000; and x is in the range from 1 to 4.

13. An adhesive composition according to claim 12 wherein the high molecular weight aldehyde polymer is a gama-polyoxymethylene ether.

14. An adhesive composition according to claim 13 wherein the gamma-polyoxymethylene ether is 2-polyoxymethylene dimethylether.

15. A single-coat adhesive composition for bonding nitrile rubber to a metal surface comprising from about 10 to 60 percent by weight of a chlorosulfonated polyethylene latex, from about 10 to 80 percent by weight of a polyhydroxy phenolic resin copolymer, and from about 1 to 30 percent by weight of a high molecular weight aldehyde polymer wherein the phenolic resin copolymer is prepared by combining a monohydroxy and/or a dihydroxy aromatic compound, as a first phenolic component, with a trihydroxy aromatic compound, as a second phenolic component, and a formaldehyde source under reaction conditions sufficient to create the phenolic resin copolymer and wherein the high molecular weight aldehyde polymer is selected from the group consisting of acetal homopolymers, acetal copolymers, gamma-polyoxymethylene ethers having the characteristic structure;

$$R_{10}O-(CH_2O)_n-R_{11};$$

and polyoxymethylene glycols having the characteristic structure;

$$HO-(R_{12}O)-(CH_2O)_n-(R_{13}O)_x-H$$

wherein $R_{10}$ and $R_{11}$ can be the same or different and each is a alkyl group having from 1 to 8 carbon atoms; $R_{12}$ and $R_{13}$ can be the same or different and each is an alkylene group having from 2 to 12 carbon atoms; n is greater than 100; and x is in the range from 0 to 8 with at least one x being equal to at least 1.

16. An adhesive composition according to claim 15 wherein the chlorosulfonated polyethylene latex is present in an amount from about 30 to 40 percent by weight, the polyhydroxy phenolic resin copolymer is present in an amount from about 30 to 60 percent by weight, and the high molecular weight aldehyde polymer is present in an amount from about 5 to 15 percent by weight.

17. An adhesive composition according to claim 1 wherein the first phenolic component is resorcinol, the second phenolic component is pyrogallol, and the formaldehyde source is formalin.

* * * * *